Aug. 5, 1969 T. O. MELKERAAEN ET AL 3,458,930

LEADLESS INVERTED DEVICE FORMING PROCESS

Filed Dec. 7, 1967 2 Sheets-Sheet 1

Inventors
Torleiv O. Melkeraaen
Raymond G. Capek
By David P. Ogden
Attorney

LEADLESS INVERTED DEVICE FORMING PROCESS

Filed Dec. 7, 1967 2 Sheets-Sheet 2

Inventors
Torleiv O. Melkeraaen
Raymond G. Capek
By David P. Ogden
Attorney 3,458,930

LEADLESS INVERTED DEVICE FORMING PROCESS

Torleiv O. Melkeraaen, Chicago, and Raymond G. Capek, Elmhurst, Ill., assignors to Zenith Radio Corporation, Chicago, Ill., a corporation of Delaware Filed Dec. 7, 1967, Ser. No. 688,903
Int. Cl. B41m *3/08;* H05k *3/12*
U.S. Cl. 29—625 3 Claims

ABSTRACT OF THE DISCLOSURE

Semiconductor element supporting packages for use in leadless inverted solid state circuit devices are produced by printing a conductive terminal coating array on a flat uncured insulation sheet from which the packages are later punched. Coating prior to final formation and solidification of the package provides improved tolerance considerations while using simplified coating techniques.

RELATED APPLICATION

The present application discloses a method of forming a package for a Leadless Inverted Solid State Circuit Device disclosed in greater detail in application Ser. No. 678,016, filed October 25, 1967, in the name of Stanley Fottler and assigned to the assignee of the present invention.

BACKGROUND OF THE INVENTION

The present invention is concerned with improved manufacture of leadless inverted solid state circuit devices and is particularly concerned with a manufacturing process that is adaptable to high speed production of packages for such devices.

One prior art leadless inverted device is initially solidified in a longitudinal channel form. A conductive coating is placed on the inner channel surfaces. Thereafter, the ceramic channel is cut into small rectangular units of about .04" by .075" by abrasive means such as a diamond saw. The conductive layer is segregated into three or more separate terminals by scribing with a very narrow diamond saw or like instrument. Obviously, the cutting of the sintered ceramic, particularly cutting through the coating without breaking the substrate, requires careful and expensive manufacturing control and tolerance maintenance of abrasive surfaces. Furthermore, since these leadless inverted devices are symmetrical, it has proved impracticable to manipulate them by automatic equipment unable to distinguish one edge of the symmetrical package from another identical edge. Other prior art package manufacture techniques such as forming, solidifying and masking each separate substrate and coating it selectively, etc. are also expensive and difficult to maintain within acceptable tolerances.

SUMMARY OF THE INVENTION

It is, therefore, an objective of the present invention to provide an improved method for producing small leadless semiconductor element solid state inverted device packages having thereon a plurality of separate electrically conductive coating elements.

In accordance with one embodiment of our invention, the manufacture of semiconductor element packages having a plurality of terminal lands coated with conductive elements extending to a connection tread level starts by preparing a slurry including a plaster binder. This slurry is formed into a plasticized sheet and partially dried to receive thereon a metalized coating array of terminal elements. The metalized coating includes metals such as palladium, platinum, gold or alloys thereof which adhere well to the ceramic and are receptive of solder, die bonding and wire bonding. When the coated sheet is dried, each individual package is punched from the sheet with at least two coating elements coupling a terminal land to a connecting tread level. The punched-out individual package is then solidified. The overall configuration of the package is shaped so that the several terminal lands may be selectively discerned even after the leadless inverted device is completed and inverted.

BRIEF DESCRIPTION OF DRAWINGS

The features of the present invention which are believed to be novel are set forth with particularity in the appended claims. The invention, together with further objects and advantages thereof, may best be understood, however, by reference to the following description taken in connection with the accompanying drawing in the several figures of which like reference numerals identify like elements and in which:

DESCRIPTION OF THE PREFERRED EMBODIMENTS

Figure 1:
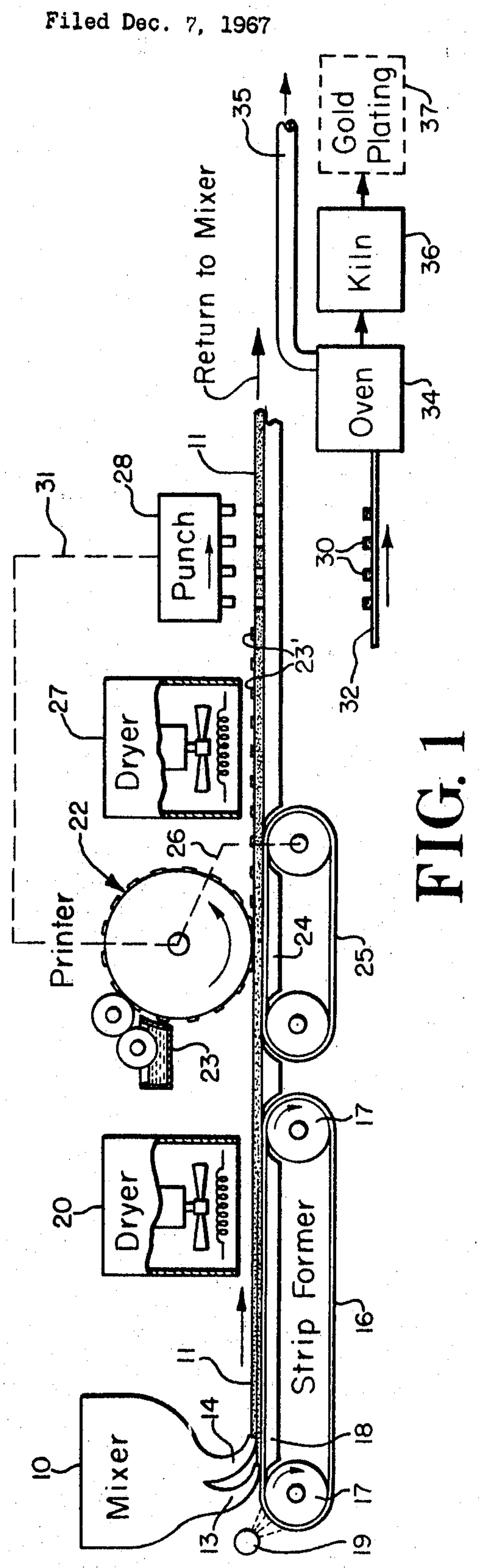
FIGURE 1 is a diagrammatic presentation of apparatus used in practicing the method of the invention.

FIGURE 1 shows a slurry mixer 10 arranged to maintain insoluble particles in suspension in a liquid vehicle containing a plastic binder. The slurry is formed into a plasticized insulation web or sheet 11. The sheet 11, is processed to become the substrate of a package portion of a leadless inverted device. Several materials having certain insulative characteristics and mechanical properties may be used as the insoluble powder to form the substrated. Ceramic materials work well. Therefore, the following disclosure of the substrates will be directed primarily to ceramic technology. Useable ceramics include steatite, forsterite, zircon porcelain, beryllia, mullite, cordierite and alumina compositions comprising from 80 to 95 percent aluminum oxide.

According to the present invention, a sheet 11 is formed of an insulative insoluble powder having a particle size of the order of 200 mesh. Powders should be carefully premixed prior to the combining with solvent, wetting agents and binder. If the powders are precalcined and ground, the resulting substrate has less shrinkage and a lower tendency to warp during firing.

It is preferred that the sheet 11 be about .05" thick with the punched-out and fired package being compacted to about .04". Substantially thinner or thicker leadless inverted device packages may be made by the method taught herein.

A vehicle to be mixed with the powders can have an organic base or an aqueous base. Many film-forming resins and powders are compatible with available organic bases, while aqueous systems are not as compatible with as many of them. Moreover, organic bases are usually more volatile and thus more quickly dried to prepare the sheet for both printing and firing. On the other hand, certain aqueous bases are less expensive. Another difference is that organic bases usually require venting for noxious fumes driven off.

The binder and plasticizer are selected to be compatible with a particular vehicle. The plasticizer modifies the characteristics of a particular sheet formation to be strong, printable and punchable.

The following materials present one example providing good results. A preferred slurry viscosity is of the order of 60,000 centipoises. Depending on the doctor blades and/or the pressure used to extrude or otherwise form the sheet 11, viscosities as high as 120,000 centipoises are acceptable.

Empirical data indicates that the proportions of powder to vehicle of the present example can vary in a range of 3:2 to 5:2. Varying the ratios regulates the flexibility and optimizes a particular conveying, printing and firing operation. For the present discussion, a ratio of 4:2 will be considered optimum.

A vehicle liquid that works well includes 52% by weight toluene and 13% polyvinyl butyral resin. One such resin is marketed as Butvar B76 resin by Monsanto Company. Another liquid portion of the slurry is 25% polyalkylene glycol having a viscosity of 600 to 700 saybolt seconds at 100° F. Union Carbide and Carbon Company sells such a glycol as Ucon oil 50–HB–660. A final major ingredient of this particular liquid system is 10% polyalkylene glycol having a viscosity of about 2000 saybolt seconds at 100° F. and sold as Ucon oil 50–HB–2000 by Union Carbide and Carbon Company.

An additional wetting agent of ¼% of alkyl phenyl polyethylene glycol ether has been used successfully with the ceramic materials specified above. It is noted that polyalkylene glycols are sulphur free and noncarbonizing when baked. This assures a clean burnoff prior to sintering solidification of the finished package.

Depending on the preconditioning of the various powders used with this slurry mix, the amount of polyalkylene glycols can be varied. Empirical data shows that such variation changes the flexibility of the sheet 11 but has very little influence on the sintered substrate. This variation is programmed in accordance with the particular printing and punching processes. In one case, the polyalkylene glycols were reduced from 25% to 8% and from 10% to 2%, respectively while still forming an acceptably flexible sheet 11, free of discontinuities such as voids and lumps and which remained suitably flat.

In order that these powders and vehicles are properly combined, bubbles in the mixer 10 are kept well above a strip formation region 13. The mixer 10 is selected should not allow slurry within the sheet formation region 13 to settle out, as this causes cracking or checking of the sheet 11. Numerous extrusion and sheet doctoring equipments are known in the art so that one of these need not be explained in detail herein.

During one sheet forming operation a double doctor blade strip formation region 13, 14 was used and no flaw was found to extend through the entire sheet 11. In a continuous sheet forming process, the sheet 11 is conveyed from mixer 10 by a belt conveyor 16 of a tough material such as Mylar plastic. The belt conveyor 16 is mounted on driven pulleys 17 to travel over a rigid bedplate 18. Various types of release agents, greases or waxes may be applied to the belt conveyor 16, as by a spray nozzle 19, in front of the formation region 13. One release agent is marketed as Collodion fluid by Fisher Scientific Company.

The sheet 11 remains on the belt conveyor 16 until it is dried sufficiently to be stripped therefrom and handled by other conveyor means. As shown, drying is augmented by a heated air dryer 20 to remove a major portion to the toluene. Usually the toluene driven off will be recovered for reuse. The dried sheet 11 accepts print without permanent deformation. In the specific system being disclosed, the drying step should not heat the sheet 11 above 100° F. At higher temperatures the vehicle oils and resins will break down and/or separate out.

In FIGURE 1, a gravure printer 22 applies to the exposed surface of the sheet 11 a metalized ink 23 composed of a vehicle containing fine conductive powders of palladium, platinum, platinum-gold alloy and/or palladium-gold alloy.

The vehicle must be compatible with the partially dried sheet 11. One acceptable ink vehicle is Kerosine K–10 marketed by Fisher Scientific Company. An incompatible solvent will rewet the sheet 11 and cause a solution which varies the conductivity of a coating array 23' formed on the sheet. Silk screen printing also provides coating arrays having good electric properties. The alloys of platinum-gold and palladium-gold develop both a good adherence to the ceramic surface and a coating element which is solderable, wire and die bondable without further plating. Somewhat less expensive molybdenum-manganese can be used as a coating metal on the sheet 11 providing the final sintering is performed in a reducing atmosphere. This requires use of a baking step in a non-reducing atmosphere to ensure resin burnout.

A steel bedplate 24 under the main printer drum provides a rigid support for the precise formation of the terminal coating array 23'. A second belt conveyor 25 may be provided to transport the sheet 11 under the printer 22, and Mylar plastic is a sufficiently hard belt material to support the sheet 11 at a very precise location on the bedplate 24. Alternatively a second roller (not shown) may convey the sheet 11 under the print roller according to well-known web printing methods. In order that terminal coating elements are not deformed, the print drum and the sheet 11 are driven at identical surface speeds. A dashed synchronization line 26 indicates the drive coupling therebetween. After application each metalized coating array 23' is allowed to dry or is dried by a dryer 27.

When the ink coating arrays 23' are dry, the sheet 11 is moved under a punch 28 for punching out the individual packages 30. The punch 28 is synchronized with the printer 22 as indicated by dashed synchronization line 31 to punch out complete arrays of terminal coating elements.

After the leadless inverted device packages 30 are punched, the residue of the sheet 11 is returned to the mixer 10 along with fluids, such as toluene, sufficient to maintain the desired level of slurry viscosity. This residue may be passed through a blender (not shown) to recombine it with the toluene prior to dumping it into the mixer 10.

The punched-out leadless inverted device packages 30 are collected on another conveyer means 32 such as a sagger whereby they advance to a baking oven 34. In the oven 34, the packages 30 are heated to remove the remaining volatiles. Otherwise at ceramic firing temperatures, internal vapor pressures are great enough to rupture some of the packages 30. For the particular system being described herein, a one hour baking at 320° F. is sufficient to remove the volatiles. Because the particular system being explained is an organic system, the oven 34 should be provided with a vent pipe 35.

The baked packages 30 are next moved to a kiln 36 wherein they are fired at temperatures greater than about 2,000° F. until they are sintered to solidification. When the ceramic used is an alumina, beryllia or mullite, firing is at temperatures about 2500° F. At these temperatures the composition of the electrode coating becomes critical as its melting point must be sufficiently above the firing temperature to prevent dissociation or liquidization thereof. It is of utmost importance that these elements maintain good ceramic adherence and conductive metal continuity. For these high temperatures a platinum or palladium coating works well. The composition of the ceramic should be chosen so that it sinters to vitrification at temperatures below the metal damaging degree. When using materials such as cordierite, steatite, forsterite and zircon porcelain, firing at temperatures below 2500° F. is adequate and provides a greater choice of metal coatings which will not be damaged. Coating arrays 23' on these ceramics are formed of palladium-gold and platinum-gold alloys with gold content increasing with lower firing temperatures. In all of these cases the materials are selected to provide high quality packages 30 while still taking advantage of this invention's simplified package making process.

After the solidification step, certain types of the packages may be selectively modified by further processing in a gold plating device 37 indicated in phantom lines. One such plating device uses electrolysis plating; another includes a vacuum vapor deposition system.

Figure 3:
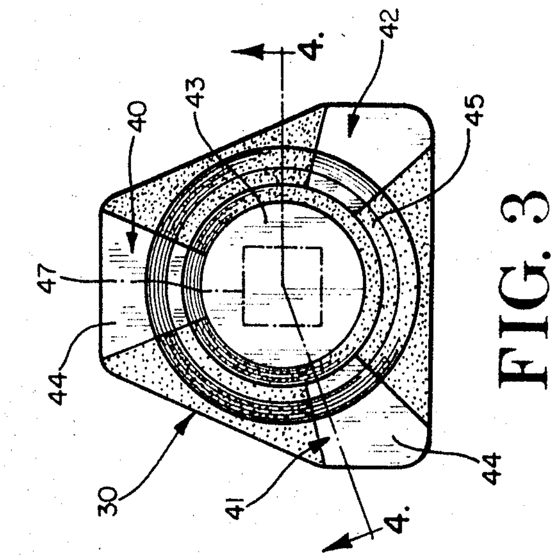
FIGURE 3 is a plan view of the completed package.
Figure 2:
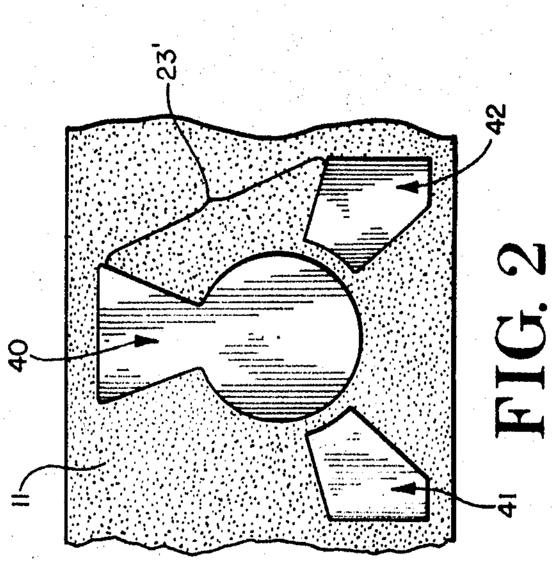
FIGURE 2 is a plan view of a coating array on a strip being processed by the apparatus of FIGURE 1.

Referring now to FIGURE 2, a portion of the printed sheet 11 is illustrated having a coating array 23' comprising a set of electrode coating elements 40, 41 and 42. According to one embodiment of this invention, the major dimensions of the coating array 23' is approximately 3/16". In FIGURE 3 the same coating array is shown with the corners rounded in the compacted and punched-out package 30.

In order to improve heat dissipation from the completed leadless inverted device, it is preferable to have the coating array 23' slightly larger than the punch-out so that the entire surface periphery of the terminal lands 44 is coated with a conductor element. The minute amount of metal recombined with the slurry will not materially affect the ceramic substrate.

Figure 4:
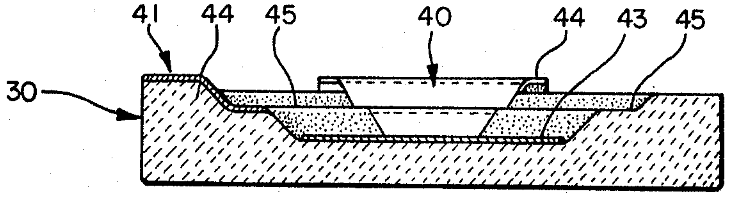
FIGURE 4 is a sectional view taken along the line 4—4 of FIGURE 3.

It should be noted from FIGURES 3 and 4 that in the particular terminal coating element 40 extends continuously inward to a lower connection tread level 43 of the package 30. This lower connection tread level 43 is created by compacting the substrate during the punching step. Also this package 30 has three terminal lands 44 above the level of an outer cup region comprising an intermediate connection tread level 45 circumscribed by a flange 46. The punch tool is shaped to provide these several levels during the punching step. The flange 46 is slightly lower than the lands 44 and is adapted to confine an epoxy or similar potting compound (not shown) in its liquid and curing states.

In a completed leadless inverted device, potting compound protects an active semiconductor device 47 (indicated in phantom lines in FIGURE 3). As shown, the intermediate connection tread level 45 is provided with flat regions suited for having semiconductor device terminal leads wire bonded thereto. Because of the fact that a major surface of the semiconductor device 47 is connected to the metal coating element 40 in the lower connection tread level 43, this coating element 40 is applied to the largest terminal land 44 to facilitate most efficient heat dissipation. The coating elements 41 and 42 are smaller and connect the tread level 45 to terminal lands 44 of a slightly different shape to provide a package outline which is neither equilateral nor equiangular. During a circuit assembly process, such a shape is easily oriented in accordance with its exposed bottom surface outline either by use of optical or mechanical detectors.

Figure 5:
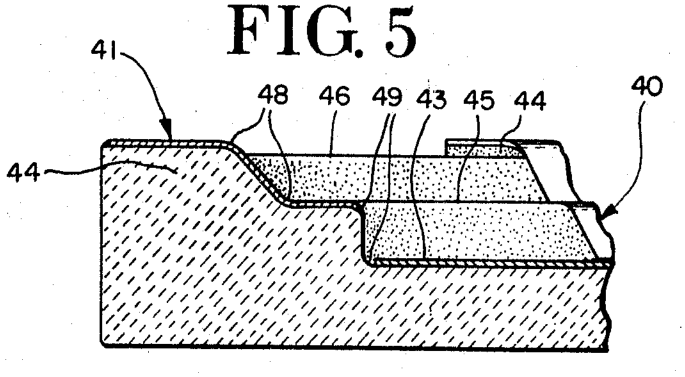
FIGURE 5 is an enlarged sectional view of the package shown in FIGURE 4.

Referring now to FIGURE 5, a sectional view of another embodiment of the region of the electrode coating element 41 is shown in greater detail. To assure a low electrical impedance coating coupling between the connection sites of this element 41, the ceramic surface is curved at the corners 48 as distinguished from a profile having sharp corners. Such curvature maintains predictable low impedance electrical coupling when the punch 28 bends the ink coating array 23' during connection level formation. The work surface of the punch 28 is provided with a sharply breaking surface corner to provide sharp corners 49 (FIGURE 5) between the electrically separated connection levels 43 and 45 where the coating elements 41 and 42 terminate.

Figure 6:
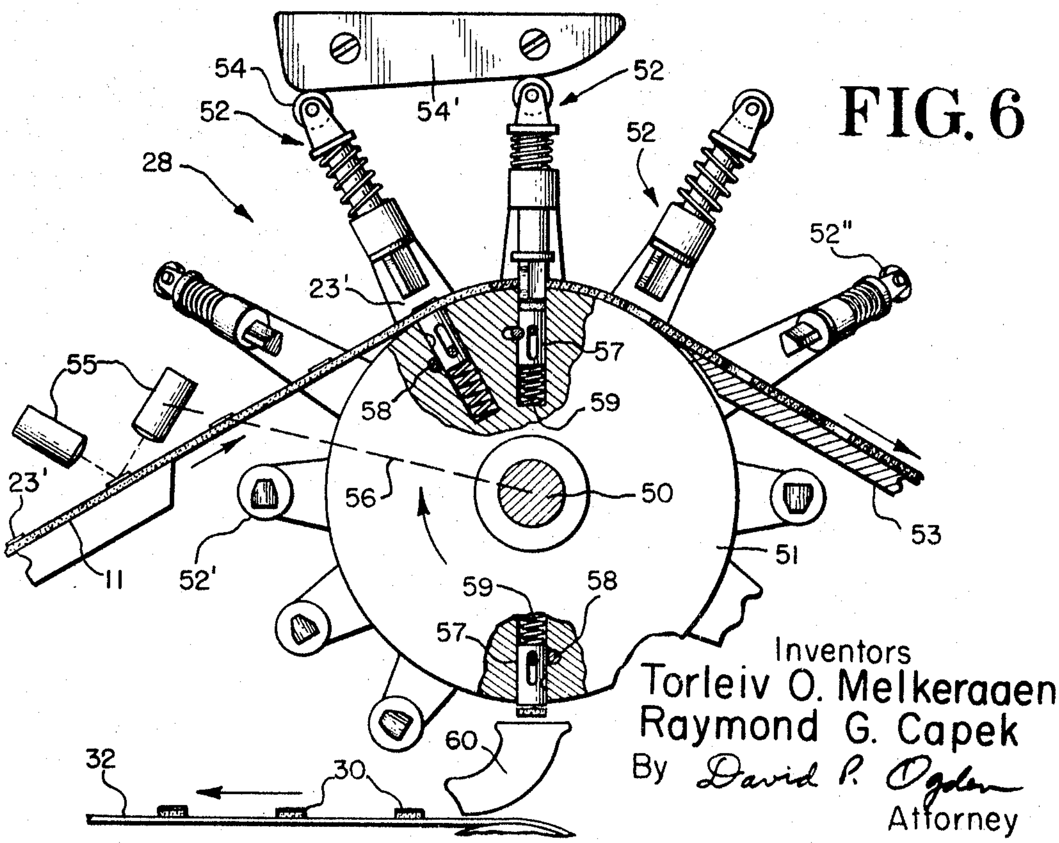
FIGURE 6 is a partially broken away simplified elevational view of a punch mechanism useable with this invention.

Referring now to FIGURE 6, a rotary drum punch mechanism 28 is indicated. A main shaft 50 rotatably supports an inner drum 51 and a plurality of punch mechanisms 52. As is known with such rotary punch systems, stationary cam track means behind the drum 51 move the punch mechanisms 52 from an open position, as indicated at 52', to a punching position. After the punching step is completed, the positioning cam means cause the punch mechanisms 52 to move out of the way as indicated at 52". With the punches 52 out of the way, the sheet 11 moves to the punch 28 and later is removed from the surface of the drum 51 over a stripper 53. The punch mechanisms 52 may be driven toward the drum 51 either hydraulically or by cam followers 54 moving under an overhead cam 54'.

As illustrated in FIGURE 6, synchronization of the punch position with each electrode ink coating array 23' is attained by a lamp-photoelectric detection system 55. The detection system 55 is coupled functionally to the drive shaft 50 as indicated by dashed synchronization line 56. The coupling of the detection system 55 and shaft 50 is adjusted by conventional timing means to attain precise punching of each package 30 to include the coating array.

In order that the punchings 30 have a precisely controlled thickness the drum 51 is rigid having therein inwardly drivable pistons 57 which are secured at their lowest position by latches 58. As shown, the punches 52 are cam driven through the sheet 11 and into a portion of the recess vacated by the pistons 57 whereby the precise thickness and compactness of the punchings 30 is determined by the location of the overhead cam 54'. The pressure developed during the punching step is about 15,000 to 20,000 p.s.i. However, as the punchings are only about .02 square inch, this maximum compacting pressure is easily attained. After the pistons 57 move past the stripper 53, the latches 58 are released by a trigger means (not shown). The released pistons 57 respond to the pressure of a bias spring 59 to push the compacted packages 30 into a conveyor chute 60. The chute 60 leads to the conveyor 32 for carrying the packages 30 to the baking oven 34.

It is readily apparent from the above disclosure that the improved method of the present invention avoids complex and expensive working of brittle sintered ceramic materials. This improved process also replaces complex masking techniques and expensive diamond sawing while providing, a more reliable and a more economical semiconductor element package. This package as shown is being produced by an in-line process, but batch processing will work as well. After cooling the package is suitable for use in high production handling techniques to provide a leadless inverted solid state device of the type described in greater detail in the above mentioned copending application Ser. No. 678,016, filed Oct. 25, 1967.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A method of forming semiconductor element leadless inverted device ceramic packages comprising the steps of:

preparing a slurry of insulating material including a plastic binder;

forming the slurry into a plasticized sheet;
drying without curing the plasticized sheet to provide a printable surface adapted to receive a coating array;
printing on the sheet a metallized coating array of terminal elements;
drying the metallized coating array;
punching and forming from the sheet an individual package having a plurality of discrete levels while concurrently forming a plurality of said terminal elements to extend between different ones of said levels;
and only thereafter curing the individual package to ceramic maturity.

2. A method according to claim 1, wherein said punching and forming step compresses the upper surface of the package to form a depressed central connection tread level with relatively raised terminal lands and an intermediate tread level, and having terminals extending from said terminal lands to said intermediate level and to said central level respectively.

3. A method according to claim 2, wherein said punching and forming step shapes the raised terminal lands so that one is substantially larger than another to provide for selective discernment thereof even when the package is inverted.

References Cited

UNITED STATES PATENTS

| | | | |
|---|---|---|---|
| 2,981,981 | 5/1961 | Luhn. | |
| 3,189,978 | 6/1965 | Stetson | 29—625 |
| 3,192,086 | 6/1965 | Gyurk. | |
| 3,235,939 | 2/1966 | Rodriguez et al. | |
| 2,389,420 | 11/1945 | Deyrup | 264—61 |

FOREIGN PATENTS

| | | |
|---|---|---|
| 920,507 | 3/1963 | Great Britain. |

JOHN F. CAMPBELL, Primary Examiner

ROBERT W. CHURCH, Assistant Examiner

U.S. Cl. X.R.

29—420, 528, 610, 697; 174—52, 68; 264—61, 132, 133, 135; 317—234